(12) United States Patent  
Lin

(10) Patent No.: US 8,480,328 B2  
(45) Date of Patent: Jul. 9, 2013

(54) FIXING DEVICE FOR EXPANSION CARDS

(75) Inventor: Po-Lin Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 62 days.

(21) Appl. No.: 13/189,585

(22) Filed: Jul. 25, 2011

(65) Prior Publication Data

US 2012/0328363 A1  Dec. 27, 2012

(30) Foreign Application Priority Data

Jun. 24, 2011  (TW) .............................. 100122350 A

(51) Int. Cl.
*F16B 21/09*  (2006.01)

(52) U.S. Cl.
USPC ........... 403/315; 403/318; 361/801; 220/4.02

(58) Field of Classification Search
USPC ....... 211/26.1, 26.2; 220/4.33, 4.02; 403/187, 403/317, 251, 261, 315, 318, 353, 316; 361/756, 361/801, 802; 312/223.2
See application file for complete search history.

(56) References Cited

U.S. PATENT DOCUMENTS

| | | | | |
|---|---|---|---|---|
| 3,804,358 A | * | 4/1974 | Gunther | 248/205.1 |
| 6,196,758 B1 | * | 3/2001 | Scarborough | 403/353 |
| 6,386,656 B1 | * | 5/2002 | Chen | 312/223.2 |
| 6,644,884 B2 | * | 11/2003 | Gledhill | 403/317 |
| 6,834,766 B2 | * | 12/2004 | Lin et al. | 211/41.17 |
| 7,130,200 B1 | * | 10/2006 | Liu | 361/801 |
| 7,525,811 B2 | * | 4/2009 | Xiao | 361/759 |
| 7,586,757 B2 | * | 9/2009 | Zhang et al. | 361/802 |
| 7,746,664 B2 | * | 6/2010 | Zhang et al. | 361/801 |
| 7,762,738 B2 | * | 7/2010 | Homner | 403/315 |

* cited by examiner

*Primary Examiner* — Michael P Ferguson  
*Assistant Examiner* — Matthew R McMahon  
(74) *Attorney, Agent, or Firm* — Altis Law Group, Inc.

(57) ABSTRACT

A fixing device for fixing an expansion card mounted with a cover plate, includes a frame and a fixing member. The frame includes a board defining an elongated slot, a plate extending in a substantially perpendicular manner from an end of the board and perpendicular to the slot, and a fixing portion extending in a substantially perpendicular manner from a side of the plate opposite to the board. A fastener is mounted to the frame adjacent to the slot of the board. The fixing member includes a sliding portion slidably mounted to the fixing portion and an operation portion extending in a substantially perpendicular manner from the sliding portion. The sliding portion defines an engaging hole to receive the fastener. The fastener is to be engaged with the cover plate. The fixing member is operable to sandwich the cover plate with the plate.

9 Claims, 5 Drawing Sheets

US 8,480,328 B2

FIXING DEVICE FOR EXPANSION CARDS

CROSS-REFERENCE OF RELATED APPLICATIONS

Relevant subject matter is disclosed in a pending U.S. patent application, titled "FIXING DEVICE FOR EXPANSION CARDS", filed on Jul. 20, 2011, with the application Ser. No. 13/187,481, which is assigned to the same assignee as this patent application.

BACKGROUND

1. Technical Field

The present disclosure relates to a device for fixing a plurality of expansion cards.

2. Description of Related Art

Modern computer systems, such as servers, workstations, and personal computers, include expansion cards electrically connected to motherboards or to circuit boards to enhance the capacity or functionality of the computer systems. An expansion card generally has an outer plate attached to an end of the expansion card. The outer plate includes an outward-extending tab. When the expansion card is plugged into a connector in a computer enclosure, the outer plate is inserted into a card slot defined in a rear panel of the computer enclosure. Screws are used to secure the tab to a support wall on the rear panel. A screwdriver must also be used to remove the screws when removing the expansion card. The installation or removal of an expansion card using a screwdriver is inconvenient and time-consuming.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
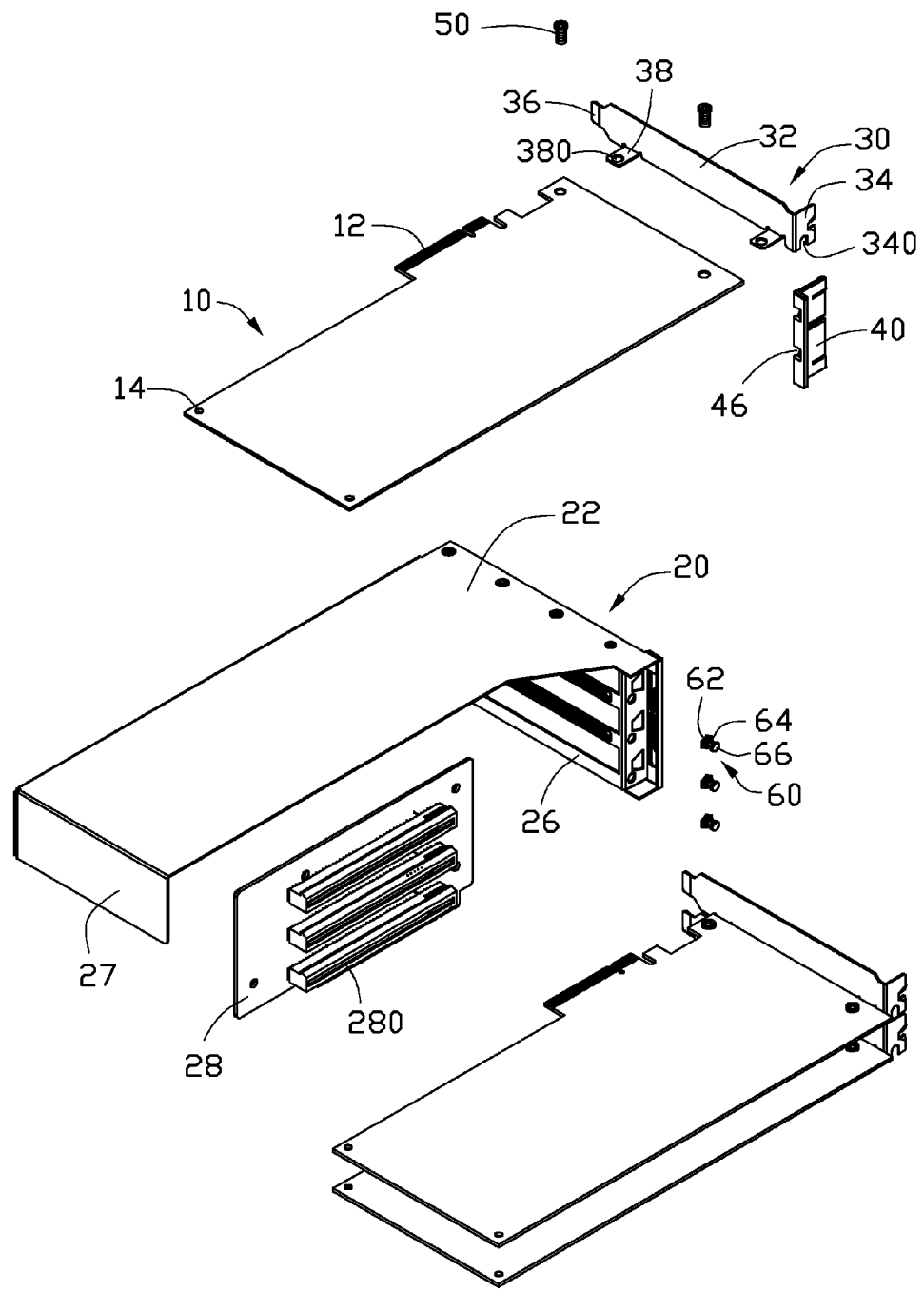
FIG. 1 is an exploded, isometric view of an exemplary embodiment of a device for fixing a plurality of expansion cards; the fixing device includes a frame and a fixing member.
Figure 2:
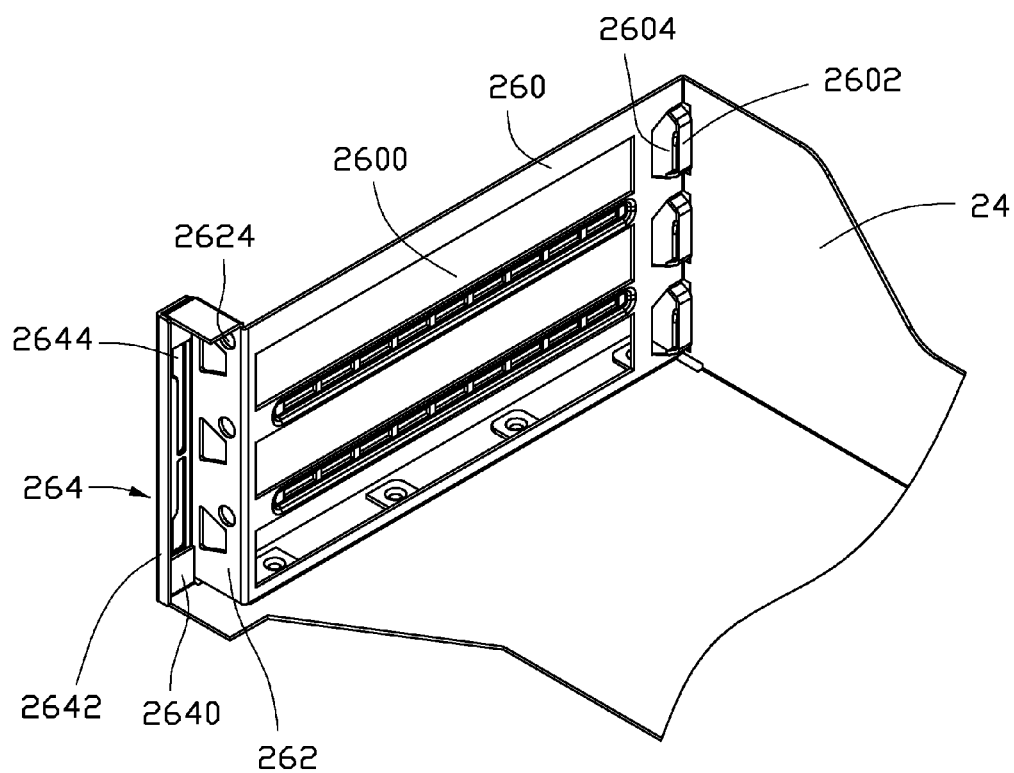
FIG. 2 is an inverted, enlarged view of the frame of FIG. 1.

Referring to FIGS. 1 and 2, an exemplary embodiment of a device for fixing a plurality of expansion cards 10 includes a rack 20, a plurality of cover plates 30, a plurality of fasteners 60, and a fixing member 40.

Each expansion card 10 forms a connection portion 12 in a side, and defines a through hole 14 in each of the four corners.

The rack 20 includes a top wall 22, a sidewall 24 extending down in a substantially perpendicular manner from a side of the top wall 22, a frame 26 and an end wall 27 extending down in a substantially perpendicular manner from the opposite ends of the top wall 22, and a circuit board 28 mounted to an inner surface of the sidewall 24. A plurality of connectors 280 are mounted to an inner surface of the circuit board 28.

The frame 26 is substantially L-shaped, and includes a board 260 connected in a substantially perpendicular manner to the sidewall 24 and the top wall 22, a plate 262 extending in a substantially perpendicular manner from an end of the board 260 opposite to the sidewall 24 and away from the end wall 27, and a substantially L-shaped installing member 264 extending in a substantially perpendicular manner from a side of the plate 262 opposite to the board 260. The board 260 defines a plurality of slots 2600 perpendicular to the sidewall 24. A bridge-shaped blocking piece 2602 is formed on an inner surface of the board 260 between the sidewall 24 and each of the slots 2600. A blocking hole 2604 is bounded by each blocking piece 2602 and by the board 260. The plate 262 defines a fixing hole 2624 corresponding to each slot 2600. The installing member 264 includes a fixing portion 2640 perpendicularly connected to the plate 262 and a bar 2642 perpendicularly extending from a side of the fixing portion 2640 opposite to the plate 262 toward the end wall 27. The fixing portion 2640 longitudinally defines two substantially L-shaped slide slots 2644.

Each fastener 60 includes a base 62, a neck 64 extending from a side of the base 62, and a head 66 mounted to a distal end of the neck 64 opposite to the base 62.

Each cover plate 30 includes a main body 32, a first tab 34 perpendicularly extending from a first end of the main body 32. An engaging piece 36 extends from a second end of the main body 32 opposite to the first end. Two second tabs 38 extending in a substantially perpendicular manner from a side of the main body 32 opposite to the first tab 34. A cutout 340 is defined in the first tab 34. A through hole 380 is defined in each second tab 38.

Figure 3:
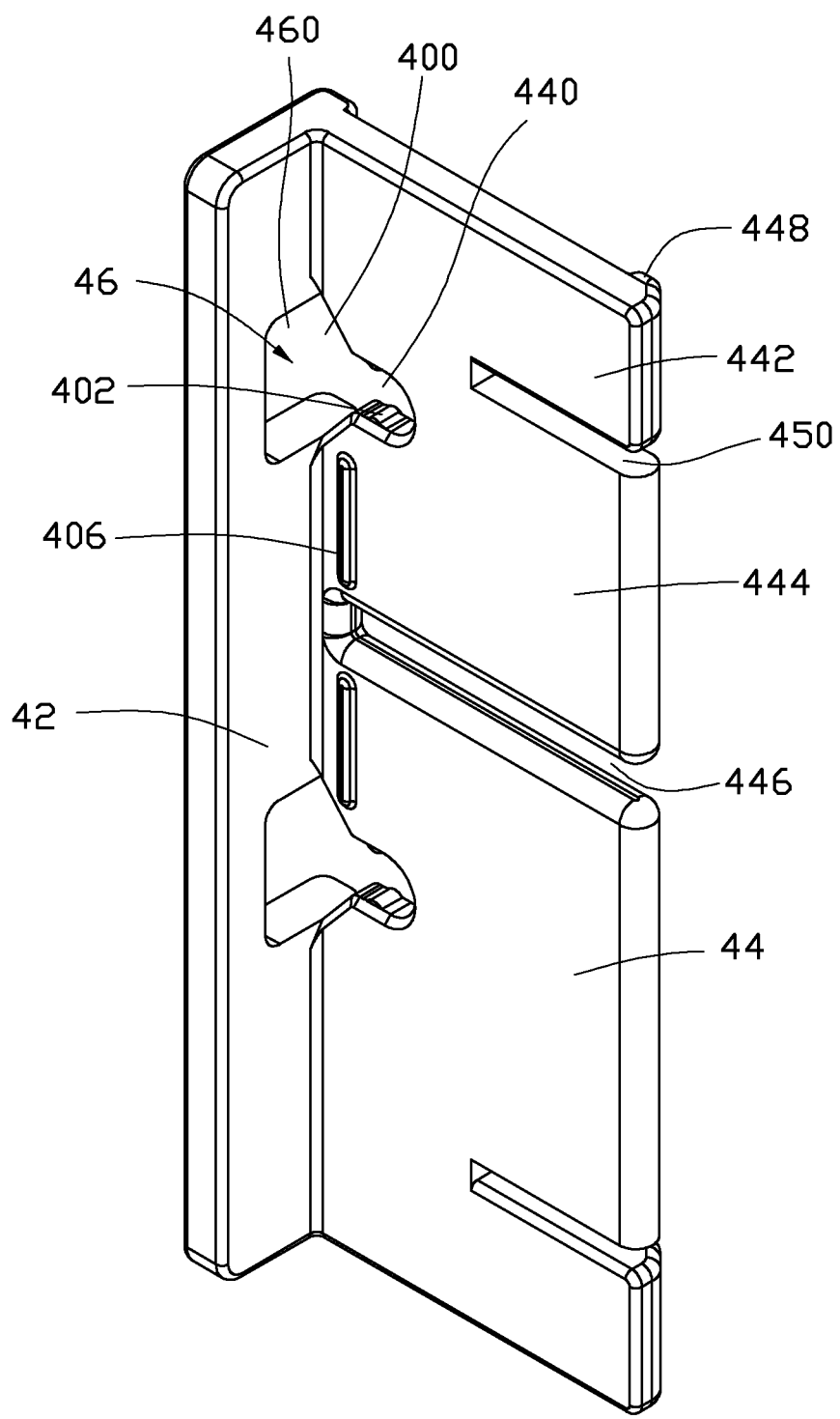
FIG. 3 is an enlarged view of the fixing member of FIG. 1, but viewed from another perspective.

Referring to FIG. 3, the fixing member 40 is substantially L-shaped. The fixing member 40 includes an operation portion 42 and a sliding portion 44 connected in a substantially perpendicular manner to a side of the operation portion 42. A plurality of engaging holes 46 is defined at the conjunction of the operation portion 42 and the sliding portion 44. Each engaging hole 46 includes a first hole 460 defined in the operation portion 42, a smaller second hole 440 defined in the sliding portion 44, and a substantially trapezoidal third hole 400 defined in the sliding portion 44 and communicating with the first and second holes 460 and 440. Two opposing projections 402 protrude toward each other from opposite sides bounding the second hole 440, adjacent to the third hole 400. The cross-section of each projection 402 is substantially semicircular. The sliding portion 44 defines an elongated first slot 446 perpendicular to the operation portion 42 in a center of the sliding portion 44, and two elongated second slots 450 at opposite sides of the first slot 446. An extension plate 444 is formed between the first slot 446 and each second slot 450. A latching plate 442 is formed at a side of each second slot 450 opposite to the first slot 446. The latching plates 442 are slightly deformable. A latch 448 extends from a distal end of each latching plate 442 opposite to and away from the operation portion 42. A protrusion 406 protrudes from a side of each extension plate 444 adjacent to the operation portion 42 and away from the latches 448.

Figure 4:
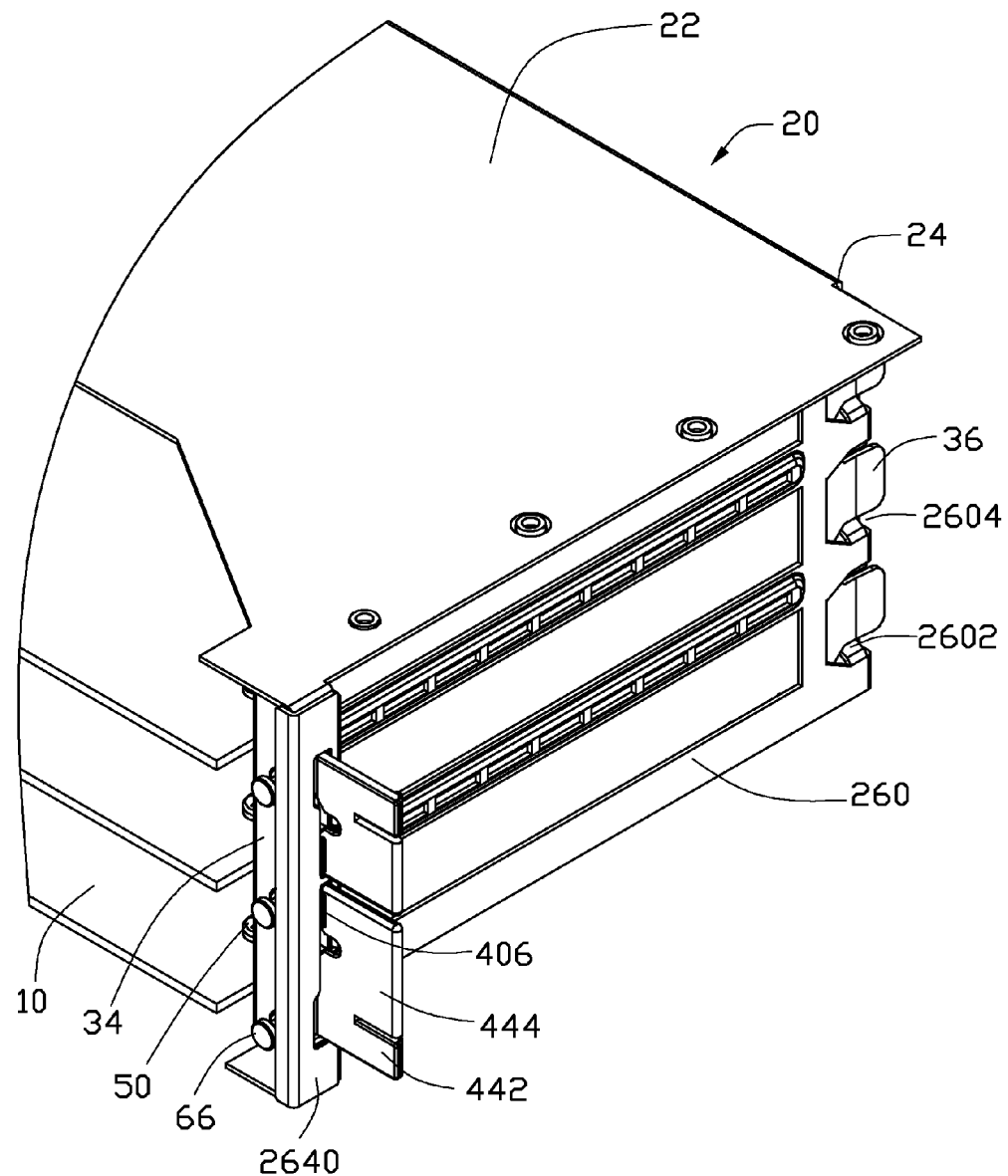
FIG. 4 is an assembled, isometric view of FIG. 1, but viewed from another angle.
Figure 5:
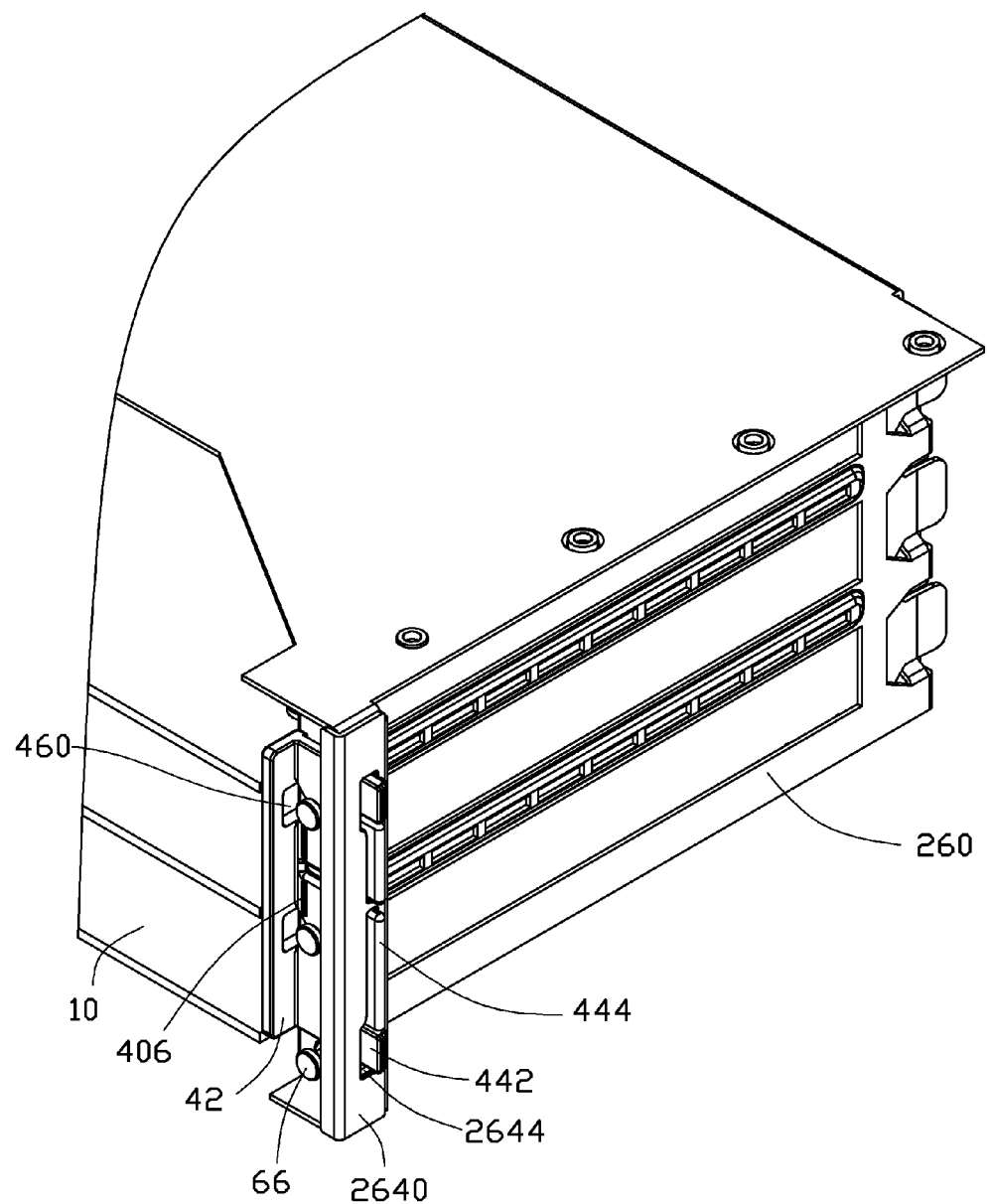
FIG. 5 is similar to FIG. 4, but showing the device in use.

Referring to FIGS. 4 and 5, in assembly, the heads 66 of the fasteners 60 extend through the corresponding through holes 2624, and the bases 62 are blocked by a side of the plate 262 opposite to the installing member 264. The extension plates 444 with the corresponding latching plates 442 of the fixing member 40 extend through the slide slots 2644, until the operation portion 42 is blocked by an inner surface of the fixing portion 2640 facing the plate 262. The protrusions 406 extends through the slide slots 2644 and are blocked by an outer surface of the fixing portion 2640 opposite to the inner surface, for mounting the fixing member 40 to the frame 26. The engaging holes 46 align with the corresponding fasteners 60.

Each cover plate 30 is attached to an end of a corresponding expansion card 10, with the through holes 380 of the second tabs 38 in alignment with the corresponding through holes 14. Two screws 50 extend through the corresponding through holes 14 and engage in the corresponding through holes 380. Thereby, the cover plate 30 is fixed to the expansion card 10. The engaging piece 36 is located at a same side as the connection portion 12.

The connection portions 12 are inserted into the corresponding connectors 280. The engaging pieces 36 are inserted into the corresponding blocking holes 2604, and the first tabs 34 are blocked by a side of the plate 262 facing the installing member 264. The necks 64 of the fasteners 60 are engaged in the cutouts 340.

The fixing member 40 is slid toward the expansion cards 10, until the necks 64 of the fasteners 60 extend through the first and third holes 460 and 400, to engage in the second hole 440 and be blocked by the projections 402. At this time, the latches 448 are blocked by the outer surface of the fixing portion 2640. The heads 66 of the fasteners 60 are blocked by the sliding portion 44. Thereby, the first tabs 34 are sandwiched between the plate 262 and the sliding portion 44.

In disengaging the expansion cards 10 from the rack 26, the fixing member 40 is slid away from the expansion cards 10, until the operation portion 42 is blocked by the inner surface of the fixing portion 2640, and the protrusions 406 are blocked by the outer surface of the fixing portion 2640. Thereby, the expansion cards 10 may easily be disengaged from the frame 26.

It is believed that the present embodiments and their advantages will be understood from the foregoing description, and it will be apparent that various changes may be made thereto without departing from the spirit and scope of the description or sacrificing all of their material advantages, the examples hereinbefore described merely being exemplary embodiments.

What is claimed is:

1. A fixing device for fixing an expansion card with a cover plate mounted at an end of the expansion card, the cover plate comprising a tab perpendicularly extending from a first end of the cover plate, the fixing device comprising:

a substantially L-shaped frame comprising a board defining an elongated slot to be covered by the cover plate, a plate extending in a substantially perpendicular manner from an end of the board and perpendicular to the elongated slot, and a fixing portion extending in a substantially perpendicular manner from a side of the plate opposite to the board;

a fastener extending from the plate of the frame, adjacent to the elongated slot of the board; and a fixing member comprising a sliding portion slidably mounted to the fixing portion and an operation portion extending in a substantially perpendicular manner from the sliding portion, the sliding portion defining an engaging hole to receive the fastener;

wherein the fastener is to be engaged with the tab of the cover plate, and the fixing member is operable to slide to sandwich the tab with the plate;

wherein the sliding portion forms a protrusion adjacent to the operation portion, a latch extends from a distal end of the sliding portion away from the operation portion; the protrusion is blocked by an outer surface of the fixing portion opposite to the board, in response to the sliding portion being slid to move the operation portion toward the fixing portion, and the latch is blocked by the outer surface of the fixing portion in response to the sliding portion being slid to move the operation portion away from the fixing portion.

2. The fixing device of claim 1, wherein a blocking piece is formed on an end of the board away from the plate, a blocking hole is bounded by the blocking piece and the board, and when fixing the expansion card, an engaging piece extending from a second end of the cover plate opposite to the first end is inserted into the engaging hole.

3. The fixing device of claim 1, wherein the fixing portion defines a slide slot, the sliding portion extends through the slide slot; the operation portion is blocked by an inner surface of the fixing portion opposite to the outer surface.

4. The fixing device of claim 3, wherein the width of a first end of the slide slot is greater than the width of a second end of the slide slot, the sliding portion of the fixing member comprises an extension plate slidably extending through the second end of the slide slot, and a resilient latching plate slidably extending through the first end of the slide slot.

5. The fixing device of claim 4, wherein the protrusion extends from the extension plate adjacent to the operation portion, and the latch extends from a distal end of the latching plate away from the operation portion.

6. The fixing device of claim 4, wherein the sliding portion defines a slot between the latching plate and the extension plate for providing deformation space.

7. The fixing device of claim 1, wherein the fastener comprises a neck extending through the plate of the frame to engage in a cutout defined in the tab of the cover plate, and a head extending from an end of the neck.

8. The fixing device of claim 7, wherein the engaging hole comprises a first hole defined in the operation portion and a second hole defined in the sliding portion and communicating with the first hole, the neck extends through the first hole to enter the second hole when the fixing member is slid to move the operation portion away from the fixing portion.

9. The fixing device of claim 8, wherein two projections are formed on opposite sides bounding the second hole of the engaging hole, adjacent to the first hole to block the neck of the fastener.

* * * * *